(12) United States Patent
Zahradnik et al.

(10) Patent No.: US 7,594,454 B2
(45) Date of Patent: Sep. 29, 2009

(54) METHODS OF FABRICATING ROTARY DRILL BITS

(75) Inventors: Anton F. Zahradnik, Sugarland, TX (US); Eric C. Sullivan, Houston, TX (US); R. Scot Smith, Erath, LA (US); Daniel E. Ruff, Kingwood, TX (US); Danielle V. Roberts, Calgary (CA); Alan J. Massey, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/947,613

(22) Filed: Nov. 29, 2007

(65) Prior Publication Data

US 2008/0066581 A1  Mar. 20, 2008

Related U.S. Application Data

(62) Division of application No. 11/090,932, filed on Mar. 25, 2005, now Pat. No. 7,472,764.

(51) Int. Cl.
   B21K 5/04   (2006.01)
   E21B 10/36  (2006.01)

(52) U.S. Cl. ..................... 76/108.1; 76/108.4

(58) Field of Classification Search ............... 76/108.1, 76/108.2, 108.4, 108.6; 175/325.2, 374, 175/408, 425, 435
See application file for complete search history.

(56) References Cited

U.S. PATENT DOCUMENTS

| | | | |
|---|---|---|---|
| 1,426,637 A | 8/1922 | Hawkesworth | |
| 3,213,951 A | 10/1965 | Eeles | |
| 4,022,287 A | 5/1977 | Lundstrom et al. | |
| 4,256,194 A * | 3/1981 | Varel | 76/108.1 |
| 4,499,958 A | 2/1985 | Radtke et al. | |
| 4,608,861 A | 9/1986 | Wachtler et al. | |
| 5,033,559 A | 7/1991 | Fischer | |
| 5,111,895 A * | 5/1992 | Griffin | 76/108.4 |
| 5,150,636 A | 9/1992 | Hill | |
| 5,225,654 A | 7/1993 | Harwig et al. | |
| 5,295,549 A * | 3/1994 | Dolezal et al. | 175/371 |
| 5,303,785 A * | 4/1994 | Duke | 76/108.2 |
| 5,441,121 A | 8/1995 | Tibbitts | |
| 5,732,783 A | 3/1998 | Truax et al. | |

(Continued)

FOREIGN PATENT DOCUMENTS

WO    98/27310 A    6/1998

OTHER PUBLICATIONS

International Search Report from PCT/US2006/010775 dated Mar. 29, 2007 (4 pages).

(Continued)

*Primary Examiner*—Jason Daniel Prone
(74) *Attorney, Agent, or Firm*—TraskBritt

(57) ABSTRACT

A shank configuration for rotary drill bits is disclosed for positioning of the shank in relation to the bit body. A tapered surface or feature of the shank may be configured and sized to matingly engage a complementarily shaped surface or feature of the drill bit body and thereby become centered or positioned in relation thereto. A deformable element may be disposed between the shank and bit body. Also, the shank may comprise a material having a carbon equivalent of less than about 0.35%. A multi-pass weld procedure may be employed to affix the shank and bit body to one another wherein welds may be formed so that one weld originates at a circumferential position that differs from the origination circumferential position of its immediately preceding weld by at least about 90°. Further, a stress state may be developed within the multi-pass weld. A method of manufacture is also disclosed.

15 Claims, 14 Drawing Sheets

U.S. PATENT DOCUMENTS

| | | | |
|---|---|---|---|
| 5,839,525 A | 11/1998 | Hoffmaster et al. | |
| 5,878,634 A | 3/1999 | Tibbitts | |
| 6,012,744 A | 1/2000 | Wilson et al. | |
| 6,026,917 A * | 2/2000 | Zahradnik et al. | 175/371 |
| 6,089,123 A * | 7/2000 | Chow et al. | 76/108.2 |
| 6,098,726 A | 8/2000 | Taylor et al. | |
| 6,116,360 A | 9/2000 | Evans | |
| 6,138,780 A | 10/2000 | Beuershausen | |
| 6,142,249 A * | 11/2000 | Zahradnik et al. | 175/371 |
| 7,387,177 B2 * | 6/2008 | Zahradnik et al. | 175/372 |
| 7,392,862 B2 * | 7/2008 | Zahradnik et al. | 175/371 |
| 7,472,764 B2 * | 1/2009 | Zahradnik et al. | 175/435 |
| 2007/0102198 A1 * | 5/2007 | Oxford et al. | 175/374 |
| 2007/0102199 A1 * | 5/2007 | Smith et al. | 175/374 |
| 2007/0102200 A1 * | 5/2007 | Choe et al. | 175/374 |
| 2007/0256862 A1 * | 11/2007 | Lund et al. | 175/39 |
| 2008/0066970 A1 * | 3/2008 | Zahradnik et al. | 175/435 |
| 2009/0008154 A1 * | 1/2009 | El Hakam et al. | 175/425 |
| 2009/0014217 A1 * | 1/2009 | Zahradnik et al. | 175/371 |
| 2009/0031863 A1 * | 2/2009 | Lyons et al. | 76/108.2 |

OTHER PUBLICATIONS

Metals Handbook®, Desk Edition, published by The American Society for Metals, eighth printing, May 1995, pp. 30-27 through 30-30.

* cited by examiner

METHODS OF FABRICATING ROTARY DRILL BITS

CROSS-REFERENCE TO RELATED APPLICATION

This application is a divisional of U.S. patent application Ser. No. 11/090,932, filed Mar. 25, 2005, now U.S. Pat. No. 7,472,764, issued Jan. 6, 2009, the disclosure of which is hereby incorporated herein by reference in its entirety.

BACKGROUND OF THE INVENTION

1. Field of the Invention

The present invention relates generally to a drill bit shank for rotary drill bits for drilling subterranean formations and to rotary drill bits so equipped.

2. State of the Art

A typical rotary drill bit includes a bit body secured to a hardened steel shank having a threaded pin connection for attaching the bit to a drill string, and a crown including a face region carrying cutting structures for cutting into an earth formation. Generally, if the bit is a fixed-cutter or so-called "drag" bit or drill bit, the cutting structures include a plurality of cutting elements formed at least in part of a superabrasive material, such as polycrystalline diamond. Rotary drag bits employing polycrystalline diamond compact (PDC) cutters have been employed for several decades. Typically, the bit body may be formed of steel, or a matrix of hard particulate material such as tungsten carbide (WC) infiltrated with a binder, generally of a copper alloy.

In the case of steel body drill bits, the bit body may typically be machined from round stock to a desired shape. Radially and longitudinally extending blades, internal watercourses for delivery of drilling fluid to the bit face, and topographical features defined at precise locations on the bit face may be machined into the bit body using a computer-controlled, multi-axis machine tool. Hard-facing for resisting abrasion during drilling is usually applied to the bit face and to other critical areas of the bit exterior, and cutting elements are secured to the blades on the bit face, generally by inserting the proximal ends thereof into cutting element pockets machined therein. After machining and hardfacing, the bit body may be secured to a hardened steel shank having a threaded pin connection for securing the steel body rotary drill bit to the drive shaft of a downhole motor or directly to drill collars at the distal end of a drill string rotated at the surface by a rotary table or top drive.

Matrix-type drill bits, on the other hand, include a bit body formed of a matrix of hard particulate material such as tungsten carbide contained within a graphite mold and infiltrated with a binder, generally of a copper alloy. Cast resin-coated sand, graphite displacements or, in some instances, tungsten carbide particles in a flexible polymeric binder, may be employed to define internal watercourses and passages for delivery of drilling fluid to the bit face, cutting element sockets or pockets, ridges, lands, nozzle apertures, junk slots and other external topographical features of the matrix-type rotary drag bit. However, because a matrix material comprising tungsten carbide or other relatively hard particles may be substantially unmachinable, a machinable steel blank is typically disposed within the bit mold prior to infiltration of the matrix material, the steel blank forming a portion of the matrix-type rotary drag bit body upon hardening of the infiltrant that affixes the blank therein. In a manner similar to fabrication of steel body drill bits, the matrix-type bit body, via the machinable blank, may be secured to a hardened steel shank having a threaded pin connection for securing the bit to the drive shaft of a downhole motor or directly to drill collars at the distal end of a drill string rotated at the surface by a rotary table or top drive.

Thus, in either steel body or matrix-type rotary drill bits, alignment between the bit body and the hardened shank is critical because the shank, which includes the threaded pin connection, may determine the axis of rotation of the bit. Alignment of the axis of rotation in relation to the cutting element design is obviously of great importance in the operation of a rotary drag bit because aspects of the rotary drill bit design may be based, at least in part, on cutting element positions as well as predicted forces thereon. For instance, so-called "anti-whirl" designs utilize a preferential lateral force directed toward a pad designed to ride against the formation in order to stabilize the rotary drag bit. Conventionally, a threaded connection has been employed between matrix-type bit bodies and the hardened shank, as described in more detail hereinbelow.

FIGS. 1A and 1B illustrate a conventional matrix-type drill bit 10 formed generally according to the description above. Conventional matrix-type drill bit 10 includes a central longitudinal axis 3 and bore 12 therethrough for communicating drilling fluid to the face of the bit during drilling operation. Cutting elements 5 and 7 (typically diamond, and most often a synthetic polycrystalline diamond compact or PDC) may be bonded to the bit face during infiltration of the bit body if thermally stable PDCs, commonly termed TSPs, are employed, or may be subsequently bonded thereto, as by brazing, adhesive bonding, or mechanical affixation.

The conventional preformed, so-called blank 14 comprising relatively ductile steel may also provide internal reinforcement of the bit body matrix 19. The blank 14 may be typically comprised of relatively ductile steel because the high temperatures experienced by the blank during infiltration may generally anneal most steel materials. Blank 14 may comprise a cylindrical or tubular shape, or may be fairly complex in configuration and include protrusions corresponding to blades, wings or other features on the bit face. The protrusions or fingers may be generally welded into longitudinal slots formed within the tubular portion of blank 14. The blank 14 and other preforms as mentioned above may be placed at appropriate locations within the graphite mold used to cast the bit body. The blank 14 may be affixed to the bit body matrix 19 upon cooling of the bit body after infiltration of the tungsten carbide with the binder in a furnace, and the other preforms are removed once the matrix has cooled. Blank 14 may be machined and affixed to shank 16 by way of threaded connection 15 as well as weld 20. Conventionally, a continuous weld may be formed between shank 16 and blank 14. The shank 16 typically is formed from an AISI 4140 steel, a material having a carbon equivalent of higher than about 0.35%, which requires the shank 16 and blank 14 to be preheated prior to welding. Shank 16 includes tapered threads 17 machined at the upper portion thereof for connecting the conventional matrix-type drill bit 10 to a string of drill pipe (not shown). Machined tapered threads 17 are formed prior to attachment of the shank 16 to the blank 14; therefore, proper alignment of the shank 16 with the blank 14 is critical.

FIG. 1C shows another conventional matrix-type drill bit 11 having a conventional shank 16 and illustrates the interface between the shank 16 and bit body 23. Conventional matrix-type drill bit 11 includes an internal bore 12 generally centered about the central longitudinal axis 3 thereof. Shank 16 includes tapered threads 17 for attachment to a drill string (not shown) as well as "bit breaker" surface 21 for loosening and tightening the tapered thread connection between the matrix-type drill bit 11 and the drill string (not shown). Shank 16 may be affixed to the bit body 23 by threaded connection 15 as well as weld 20. Of course, bit body 23 includes a blank (not shown) that provides the interfacing surface between the bit body 23 and the shank 16.

FIG. 1D shows a conventional steel body rotary drill bit 30 including bit body 44 and internal bore 32 generally centered about central axis 33. As FIG. 1D shows, conventional steel body rotary drill bit 30 includes shank 36 having a threaded connection 37 for connecting to a drill string wherein the shank 36 is affixed by weld 40 to the bit body 44. Bit body 44 may also carry blade(s) 42 having cutting elements 38 for removing formation during subterranean drilling.

As may be seen in FIGS. 1C and 1D, in manufacturing either a matrix-type or steel body rotary drill bit, a shank is affixed to a bit body. In addition, in conventional welding of a shank to a bit body of a rotary drill bit, the shank may comprise a material having a carbon equivalent of higher than about 0.35%, such as, for example, an AISI 4140 steel. Therefore, the shank and bit body may be preferably preheated to about 700° Fahrenheit before welding begins. Further, conventional welding procedures may designate that as the shank is welded to the bit body, if the temperature of the shank reaches 900° Fahrenheit the welding procedure may be interrupted until the temperature is reduced. When the conventional weld procedure resumes subsequent to delay caused by either overheating or inadequate heating of the shank, the weld may continue from substantially the same circumferential position as occurred at initiation of the delay.

U.S. Pat. No. 6,116,360 discloses, in discussing a prior art steel bodied bit, a shank welded to a steel bit body that protrudes therein. However, the mating surfaces between the shank and the steel bit body are not tapered.

In addition, U.S. Pat. No. 5,150,636 to Hill discloses a shrink-fit between a cutting head and a shank. Further, Hill discloses that the tip of the shank may have a slight reverse taper to better retain the cutting head.

It has been observed by the inventors herein that the conventional threaded connection between the shank and blank may generate undesirable stresses within the threaded joint and proximate weld joint. In addition, the conventional threaded connection may produce misalignment between the shank and bit body. Further, it has been observed that a conventional single-pass weld between the blank and shank may allow or even promote distortion and misalignment therebetween. Thus, it would be advantageous to eliminate the need for preheating of the shank prior to welding the shank to the bit body and a need exists for an improved shank configuration for use in fabricating rotary drill hits.

BRIEF SUMMARY OF THE INVENTION

The present invention provides a well-reasoned, practically implementable shank configuration particularly suitable for rotary drill bits, which configuration may be tailored to specific bit sizes and arrangements. In the inventive shank configuration, the shank may comprise, a material having a carbon equivalent that is less than about 0.35%, for example, an AISI 4130 steel or AISI 4130MOD steel. Such a configuration may enable elimination of preheating prior to welding that is typically required by conventional shank materials, such as AISI 4140 steel, and the present invention contemplates and encompasses a method of welding a shank structure to a portion of a bit body without preheating of the shank structure.

Also according to the present invention, positioning of the shank in relation to the bit body may be accomplished by engagement of tapered surfaces thereof. For instance, a tapered surface or feature of the shank may be configured and sized to matingly engage a complementarily shaped surface or feature of the drill bit body, such as on a portion of a blank in the case of a matrix-type bit or any suitable portion of the body in the case of a steel body bit, to become centered or positioned in relation thereto. The present invention is not limited to any particular tapered surface, since many arrangements may provide such positioning and more than one tapered surface may be employed. A tapered surface or feature configuration may improve positioning of the blank in relation to the shank, and also may eliminate conventional machining of threads therebetween. Exemplary tapered, complementary surfaces that may be easily formed for implementation of the present invention include without limitation surfaces of revolution such as frustoconical surfaces, wherein such surfaces of revolution may be formed by machining.

In addition, a multi-pass weld procedure may be employed wherein multiple individual circumferential welds originate from different circumferential positions. Such a weld procedure and configuration may align or maintain alignment of the welded assembly of the shank with the bit body by equalizing or minimizing distortion caused by conventional welding processes. Put another way, a multi-pass weld may be formed wherein subsequent weld origination circumferential positions are offset from immediately preceding weld origination circumferential positions.

For instance, a first weld may originate at a first position and extend around the circumference of a weld recess to a second position. A second weld may then be formed that originates from a substantially different circumferential position than the circumferential beginning point of the first weld. Subsequent welds, similarly, may be formed so that each subsequent weld originates at a circumferential position that differs from its preceding weld's originating position. In one embodiment, the originating position for a subsequent weld may be separated from the circumferential origination position of its preceding weld by between about 90° and about 180°.

It is specifically contemplated that the blank and shank configuration according to the present invention may be applied to coring bits, bi-center bits, eccentric bits, reaming tools and other drilling structures as well as to full-bore drill bits. As used herein, the term "bit" encompasses all of the foregoing drilling structures, whether steel or matrix-type. Moreover, the present invention is not limited to any particular structure for steel or matrix-type rotary drag bits and may be applied to rotary drag bits fabricated by various methods. It is further contemplated that the blank and shank configuration according to the present invention may be applied to fabrication of roller cone bits, and the term "bit" as used herein encompasses such assemblies.

DETAILED DESCRIPTION OF THE INVENTION

Figure 1A:
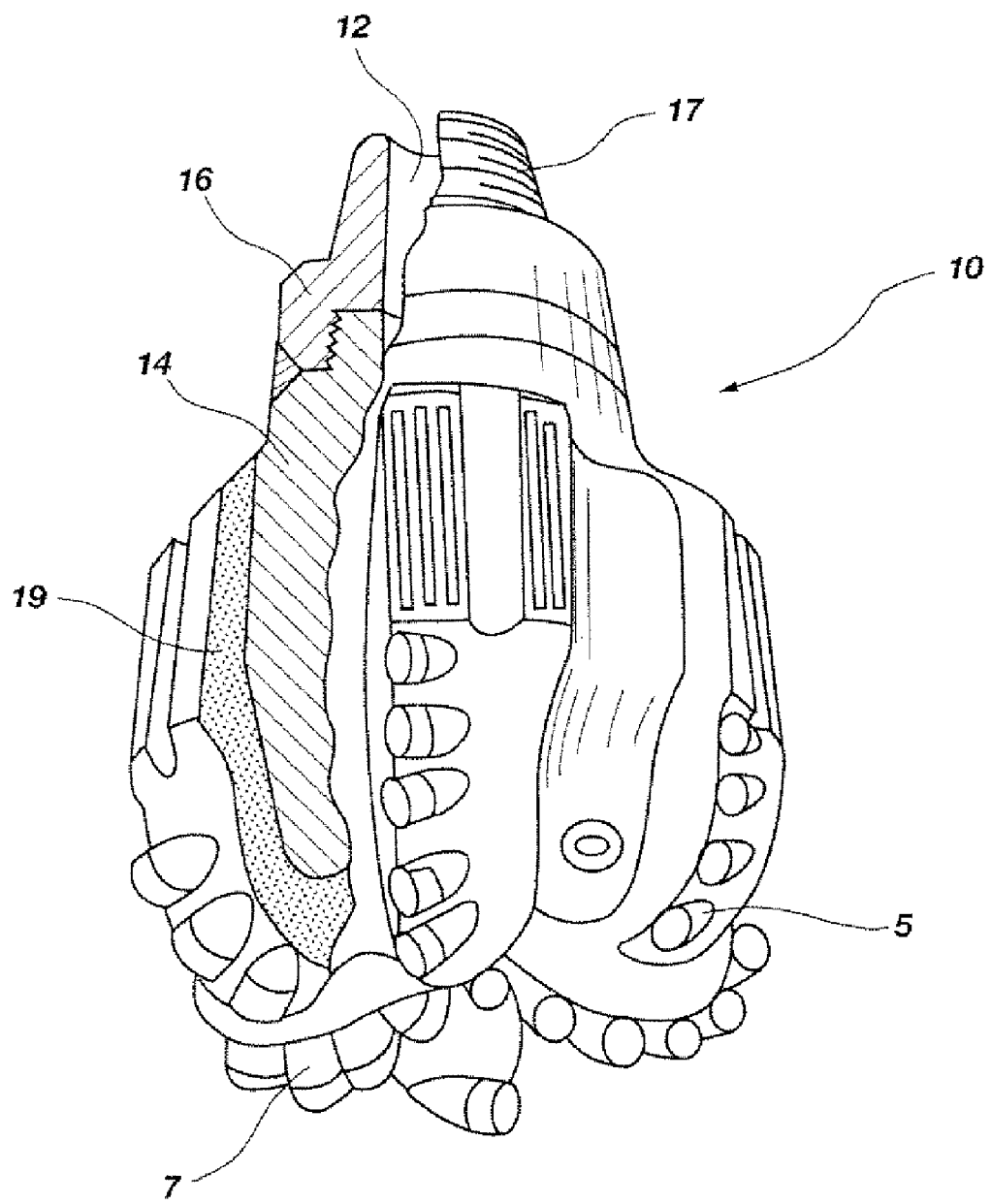
FIG. 1A is a perspective view of a conventional matrix-type rotary drag bit.
Figure 1B:
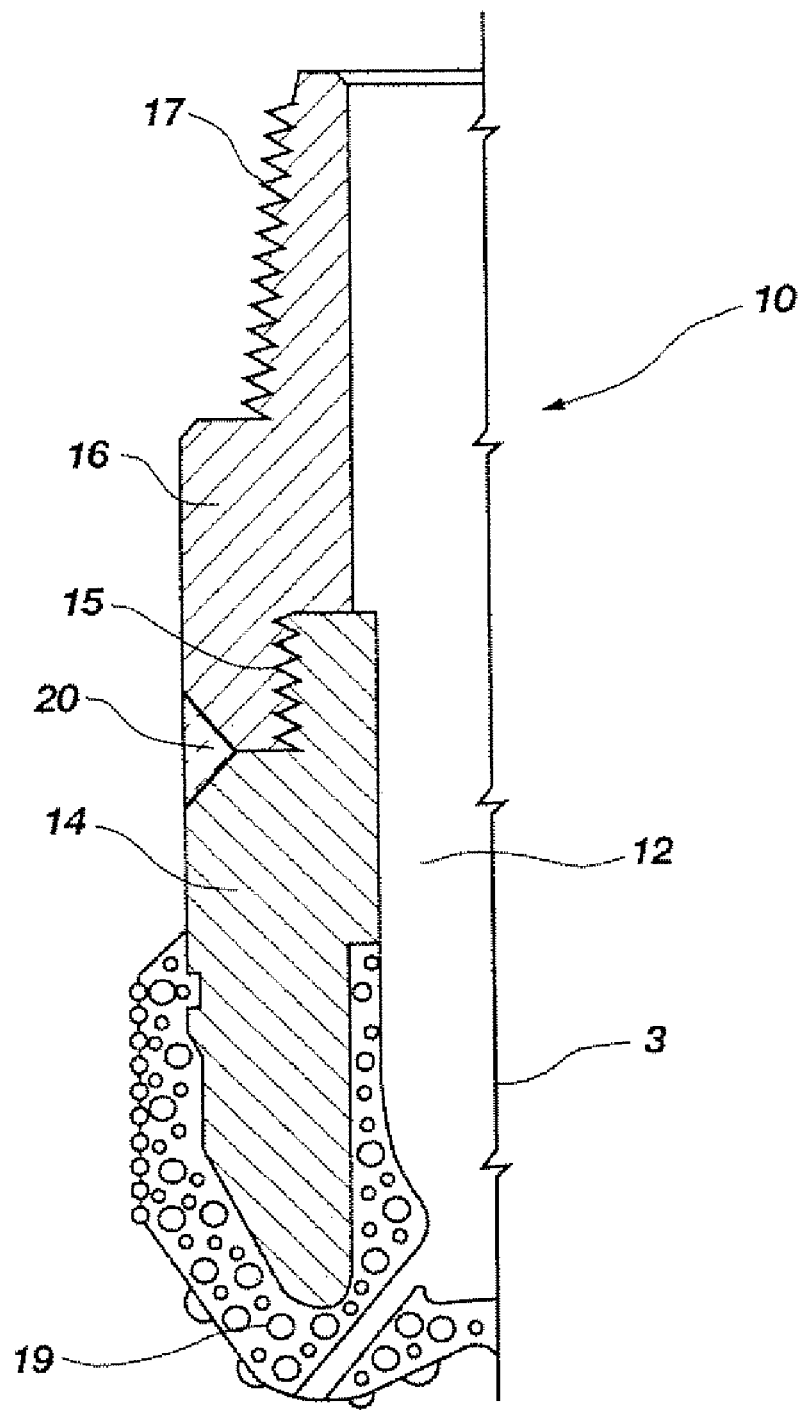
FIG. 1B is a partial schematic side cross-sectional view of the conventional matrix-type rotary drag bit shown in FIG. 1A.
Figure 1C:
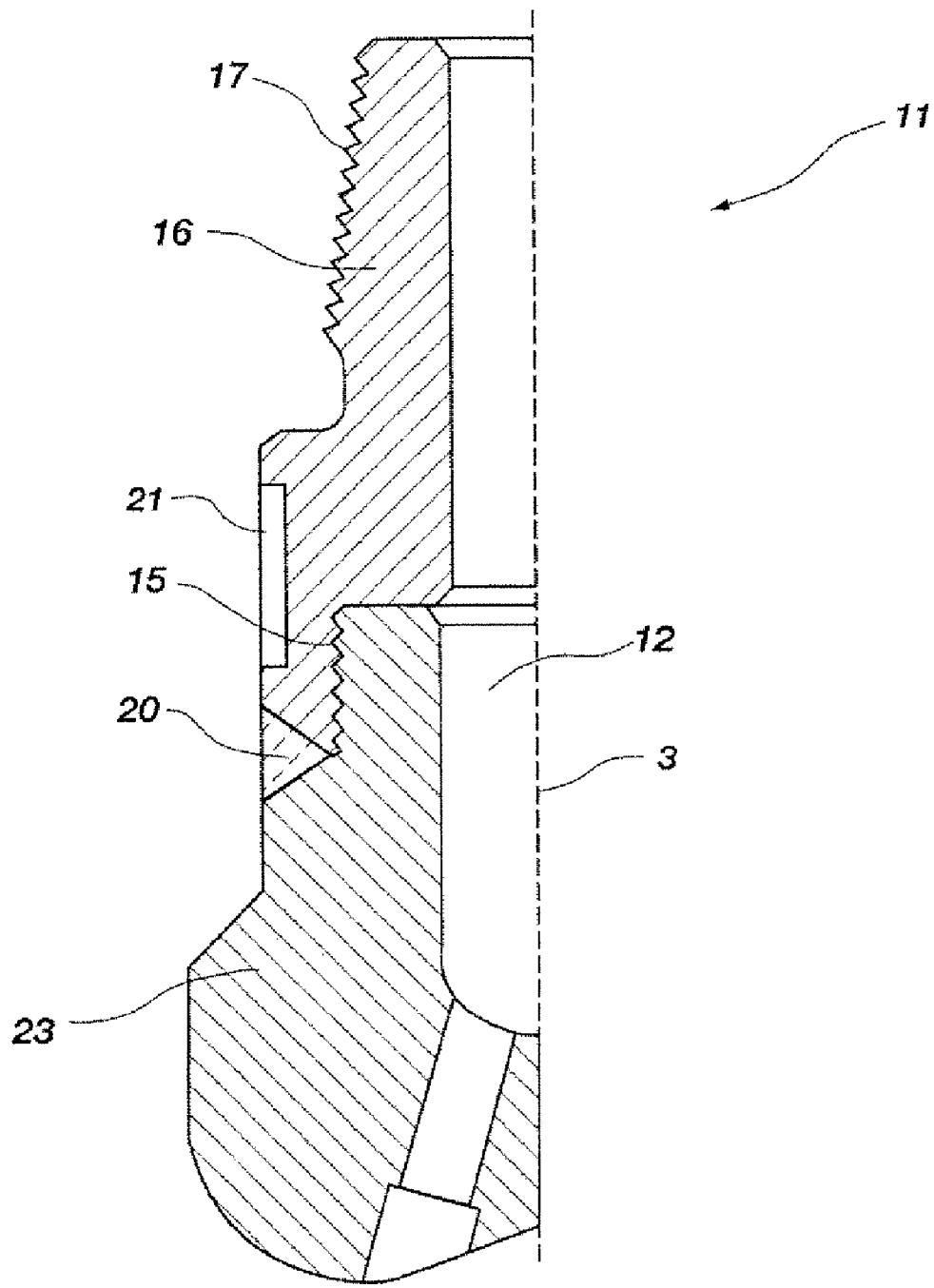
FIG. 1C is a partial side cross-sectional view of shank and bit body of a conventional matrix-type rotary drag bit.
Figure 1D:
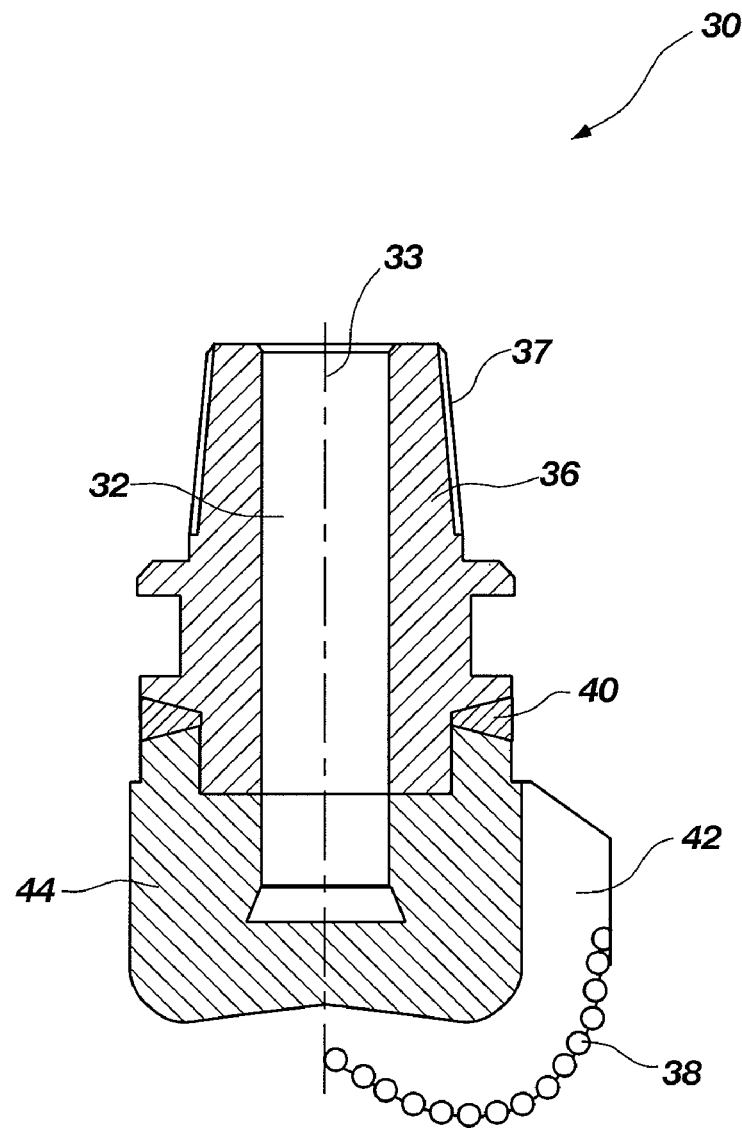
FIG. 1D is a side cross-sectional view of a conventional steel body rotary drill bit.
Figure 2A:
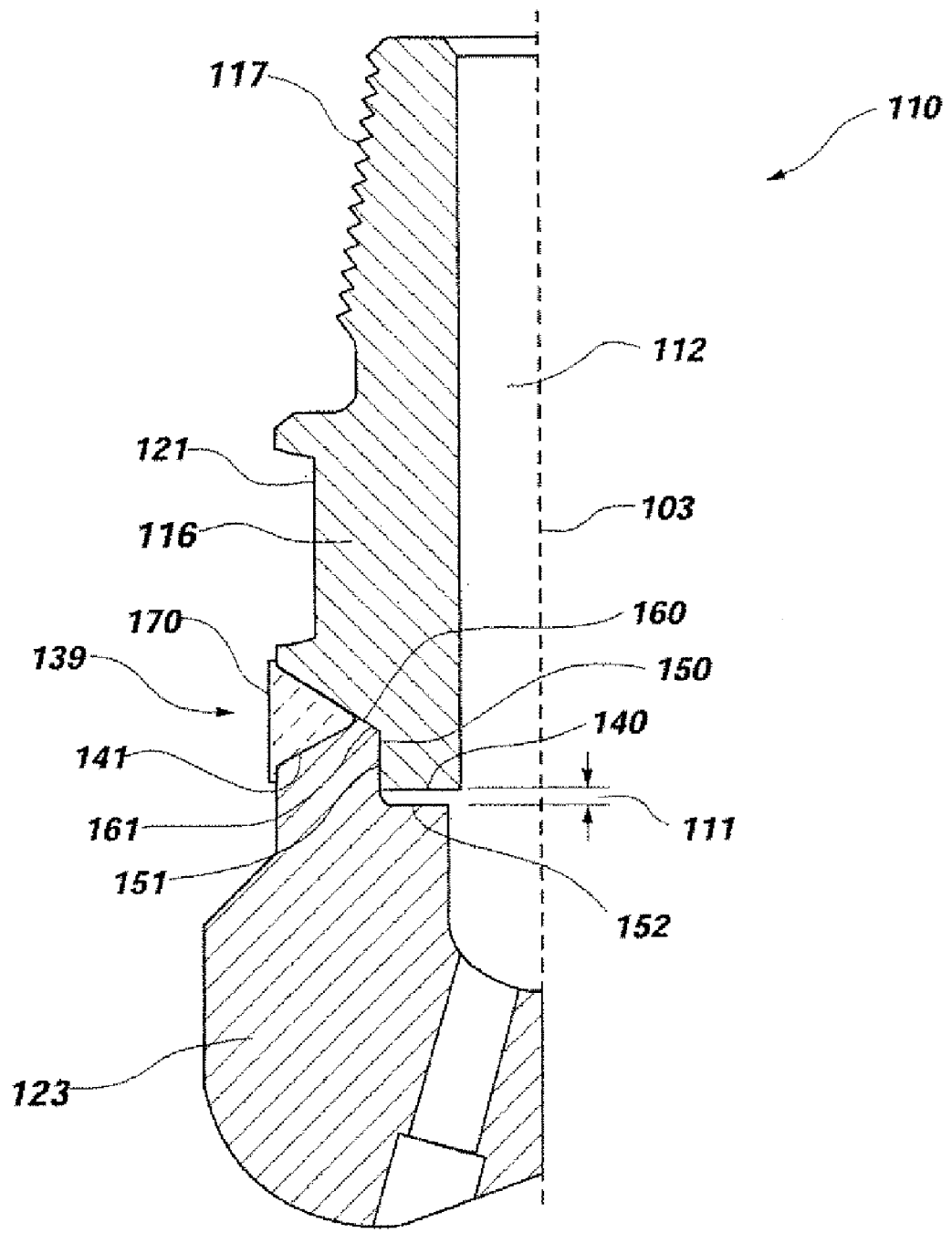
FIG. 2A is a partial side cross-sectional view of shank and rotary drill bit body of the present invention.

FIG. 2A depicts a partial cross-sectional view of matrix-type rotary drag bit 110 according to the present invention. Rotary drag bit 110 includes central longitudinal axis 103 about which bore 112 is generally disposed. Shank 116 may be comprised of a material having a carbon equivalent of less than about 0.35%, such as, for example and not by way of limitation, an AISI 4130 steel or AISI 4130MOD steel and may include a threaded pin connection 117, as known in the art, for connection to a drill string (not shown) as well as a bit breaker surface 121 for assembly and disassembly thereto and therefrom, respectively. It may be desirable for the shank material to have a carbon equivalent of even less than about 0.35% such as, for example, less than about 0.30%. It will also be appreciated by those of ordinary skill in the art that the material selected for shank 116 exhibits, for example, at least a minimum yield strength, a minimum ultimate tensile strength and a minimum impact strength suitable for conditions encountered during drilling with rotary drag bit 110. The aforementioned AISI 4130 and AISI 4130 MOD steels possess such desirable mechanical properties.

Generally, a carbon equivalent is an empirical value in weight percent that relates the combined effects of different alloying elements used in the making of metal alloys, such as steels, to an equivalent amount of carbon, as an indication of weldability or susceptibility to weld cracking. A carbon equivalent may be used for hardenable carbon and alloy steels, without limitation. Further, as seen from the following equation, it is not necessary that the material include carbon to have a non-zero carbon equivalent. Different formulas for computing a carbon equivalent of a material, as known in the art, have been developed. The present invention contemplates use of different empirical formulas for computation of a carbon equivalent. For example, one formula for a carbon equivalent of a given material, provided from the Metals Handbook®, Desk Edition, published by The American Society for Metals, eighth printing May, 1995, is given below.

$$CE = \%C + \frac{\%Cr + \%Mo + \%V}{5} + \frac{\%Si + \%Ni + \%Cu}{15}$$

Where:
CE is the carbon equivalent in weight percent;
% C is the weight percent of carbon in the material;
% Cr is the weight percent of chromium in the material;
% Mo is the weight percent of molybdenum in the material.
% V is the weight percent of vanadium in the material;
% Si is the weight percent of silicon in the material;
% Ni is the weight percent of nickel in the material; and
% Cu is the weight percent of copper in the material.

Thus, it will be appreciated that a material possessing desired mechanical properties for use in shank 116 may be readily qualified in terms of carbon equivalent as to its suitability for use in implementation of the present invention.

In addition, shank 116 may also include tapered surface 160 configured to matingly engage complementary tapered surface 161 of bit body 123, thus positioning shank 116 with respect to bit body 123 and forming, in combination with tapered surface 141 of bit body 123, weld recess 139. By way of example only, and as applicable to this and the other illustrated embodiments of the present invention, the referenced tapered surfaces may, but do not necessarily have to be, implemented as frustoconical surfaces. Vertical surface 150 of shank 116 may extend within bit body 123 along vertical surface 151 of bit body 123, but may be configured with tapered surface 160 to position shank 116 with respect to bit body 123. FIG. 2A also shows that horizontal surface 140 radially inward of tapered surface 160 may be separated from horizontal surface 152 of bit body 123 by gap 111 to prevent contact therebetween, because such contact may affect position of shank 116 in relation to bit body 123, notwithstanding mutual contact of tapered surface 160 and tapered surface 161. As noted above, radially outermost portions of tapered surface 160 and tapered surface 161 together define circumferential weld recess 139 wherein a weld 170, such as a multi-pass weld according to the present invention, may be formed.

Figure 2B:
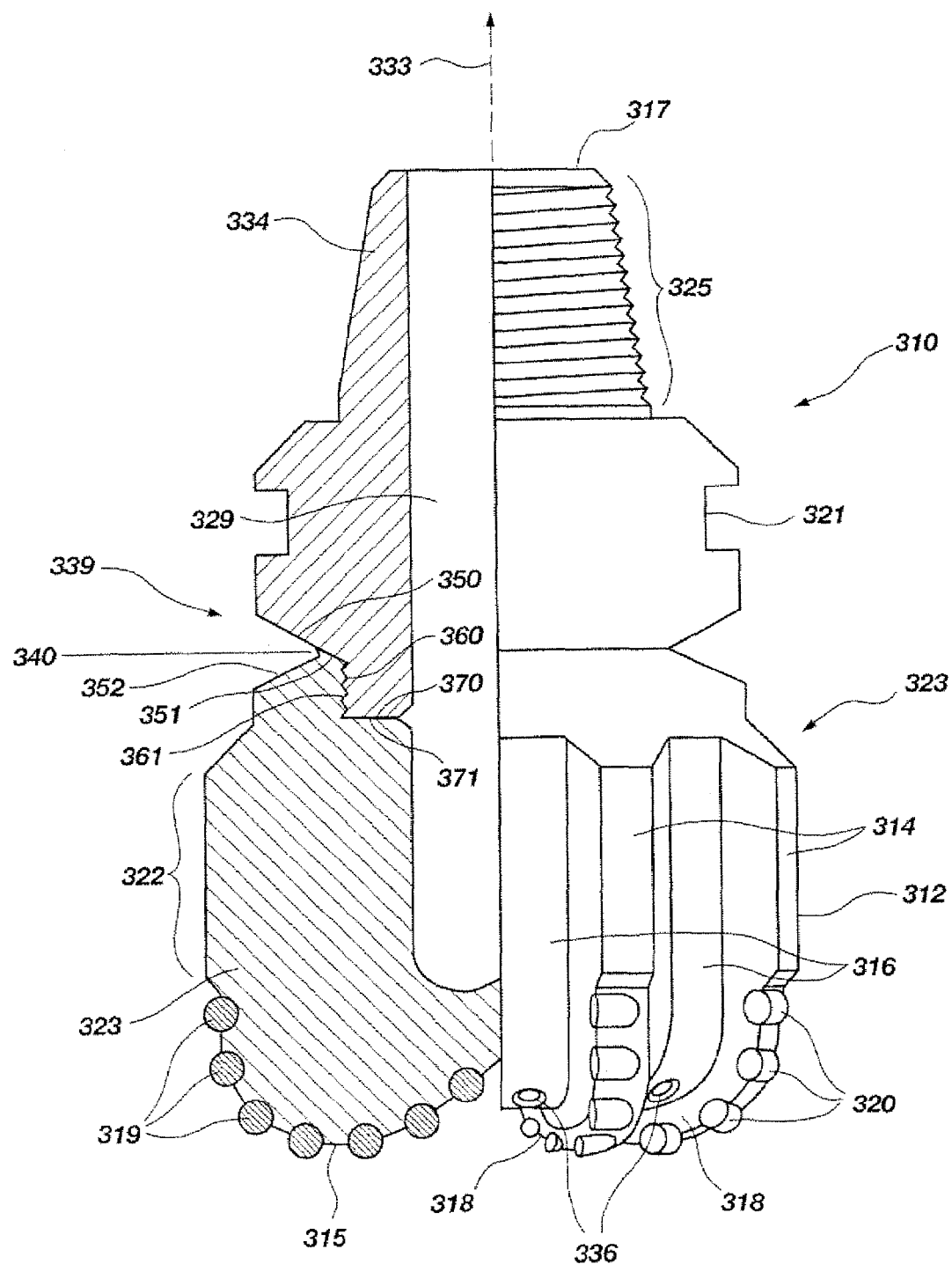
FIG. 2B is a partial side cross-sectional view as well as a partial side view of a shank and bit body of the present invention.

FIG. 2B shows a partial side cross-sectional view of a rotary drill bit 310 (left-hand side of figure) and a partial side view of rotary drill bit 310 about its longitudinal axis 333 (right-hand side of figure) prior to welding in accordance with the present invention. Rotary drill bit 310 may generally comprise a bit body 323 including a plurality of longitudinally extending blades 314 defining junk slots 316 therebetween. Each blade 314 may define a leading or cutting face 318 that extends radially along the bit face around the distal end 315 of the rotary drill bit 310, and may include a plurality of cutting element pockets 319 formed within bit body 323 and oriented for affixing cutting elements 320 therein to cut a subterranean formation upon rotation of the rotary drill bit 310. Cutting elements 320 are shown for illustration only, as they may be affixed to the cutting element pockets 319 after the shank 334 is welded to the bit body 323. Shank 334, according to the present invention, may comprise a material having a carbon equivalent of less than about 0.35%, such as an AISI 4130 or AISI 4130MOD steel. Each blade 314 may include a longitudinally extending gage portion 322 that corresponds to the gage 312 of each blade 314, sized according to approximately the largest-diameter-portion of the rotary drill bit 310 and thus may be typically only slightly smaller than the diameter of the hole to be drilled by rotary drill bit 310. The upper longitudinal end 317 of the rotary drill bit 310 includes a threaded portion or pin 325 to threadedly attach the rotary drill bit 310 to a drill collar or downhole motor, as is known in the art. In addition, a bore or plenum 329 longitudinally extends within rotary drill bit 310 for communicating drilling fluid therewithin through nozzles 336 disposed on the face of the rotary drill bit 310 through passages (not shown) extending from plenum 329 to nozzles 336. Threaded portion 325 may be machined directly into the upper longitudinal end 317 of the shank 334 as may bit breaker surface 321, for loosening and tightening the tapered threaded portion 325 of the rotary drill bit 310 when installed into the drill string, the shank 334 engaging the bit body 323 of the rotary drill bit 310 at its distal end 315 as depicted in the cross-sectional view thereof.

Also as shown in FIG. 2B, the tapered surface 350 of the shank 334 may matingly engage the tapered surface 351 of the bit body 323 in order to position the shank 334 in relation to the bit body 323. Of course, vertical surface 360 of shank 334 may engage vertical surface 361 (vertical surfaces 360 and 361 not necessarily being threaded as depicted in FIG. 2B) and horizontal surface 370 of shank 334 may or may not engage horizontal surface 371 according to actual clearances therebetween, the desirability of a gap being heretofore described with respect to FIG. 2A. Weld recess 339 may be formed by tapered surface 350 of shank 334 and tapered surface 352 of the bit body 323.

Figure 2C:
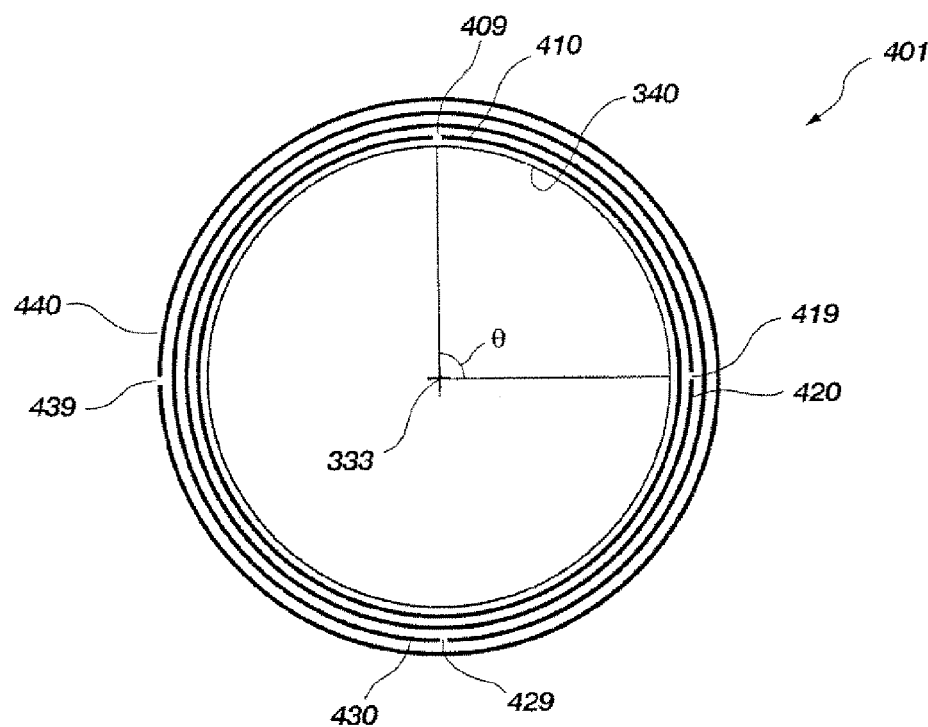
FIGS. 2C and 2D illustrate schematic top views of a multiple-pass weld and welding process of the present invention.

A multi-pass weld of the present invention, as described hereinbelow, may be formed and disposed generally within weld recess 339. As noted above, shank 334 may comprise a material having a carbon equivalent of less than about 0.35%, such as, for example, an AISI 4130, an AISI 4130MOD steel, or an equivalent material. Therefore, preheating shank 334 prior to initiating the welding process may not be necessary. As a further advantage, aligning the shank 334 with respect to the bit body 323 and then tack-welding the assembly together may be accomplished. FIG. 2C shows a schematic top cross-sectional view of multi-pass weld 401 of the present invention in relation to the inner apex or tip 340 of the weld recess 339 as shown in FIG. 2B. More particularly, FIG. 2C shows a top view of the inner boundary of weld recess 339, as defined by tip 340 thereof, as well as welds 410, 420, 430, and 440. Welds 410, 420, 430, and 440 are depicted as concentric rings or circles of increasing diameter and are shown as being separate from one another. However, FIG. 2C is merely schematic, and welds 410, 420, 430, and 440 are depicted as shown merely for clarity. Welds 410, 420, 430, and 440 may be disposed anywhere generally within weld recess 339, depending on the size of the previous welding passes and the size of the weld recess 339. Of course, the longitudinal position of any weld of the present invention may be varied in order to fill the weld recess relatively evenly.

As shown in FIG. 2C, a first weld 410 or "root" weld may be deposited within the weld recess 339, or more specifically, positioned along the circumference of tip 340 of the weld recess 339 formed by the interface between the facing surfaces 350 and 352 of the shank 334 and the bit body 323. First weld 410 may extend around the circumference of tip 340 of weld recess 339. First weld 410, as shown in FIG. 2C, may originate at circumferential position 409 and may also terminate thereat. Alternatively, first weld 410 may originate at a first circumferential position and may terminate at a second circumferential position. Second weld 420, as shown in FIG. 2C, may originate at circumferential position 419 and may terminate thereat. Alternatively, second weld 420 may originate at a first circumferential position separated from the circumferential origination position of the first weld 410 by at least about 90° and may terminate at a second circumferential position.

Therefore, circumferential position 409 may be separated from circumferential position 419 by at least about 90°, measured in relation to the longitudinal axis 333 of drill bit 310, either in the clockwise or counter-clockwise direction. Separation angle θ, shown by FIG. 2C, illustrates such a measure of separation between circumferential position 409 and circumferential position 419. Further, second weld 420 may originate at a first circumferential position separated from the originating circumferential position of the immediately preceding weld by at least about 90°, and may terminate at a second circumferential position. In addition, second weld 420 may be formed about longitudinal axis 333 in a circumferential direction (clockwise or counter-clockwise) opposite to or consistent with the direction that the initial weld 410 was formed.

Third weld 430, as shown in FIG. 2C, originates at circumferential position 429 and also terminates thereat. More generally, third weld 430 may originate at a first circumferential position separated from the originating circumferential position of the immediately preceding weld by at least about 90°, and may terminate at a second circumferential position. Fourth weld 440, as shown in FIG. 2C, originates at circumferential position 439 and also terminates thereat. Similarly, fourth weld 440 may originate at a first circumferential position separated from the originating circumferential position of the immediately preceding third weld 430 by at least about 90°, and may terminate at a second circumferential position. As may also be seen from FIG. 2C, circumferential originating positions 409, 419, 429, and 439 may be substantially symmetrically distributed about the circumference of tip 340 of weld recess 339.

Of course, the separation between an originating position of a preceding weld and the originating position of a subsequent weld may be measured in relation to the circumferential distance therebetween. For instance, the circumferential separation distance between circumferential position 409 and circumferential position 419 may be at least about one quarter of the circumference of the circle depicting weld recess tip 340.

Therefore, a multi-pass weld of the present invention may include an initial weld originating at a first circumferential position and terminating at a second circumferential position and a second weld originating at a circumferential position at least about 90° from the first position of the first weld or at least about one quarter of the circumference of the tip 340 of weld recess 339. Subsequent welds may originate at respective circumferential positions that are separated by at least about 90° from the circumferential originating position of their immediately preceding weld or a distance of at least about one quarter of the circumference of the tip 340 of weld recess 339, therearound, respectively. Circumferential positions may only be separated by up to 180°, since such positioning would be on opposite sides of a line from one edge of the circumference through the center thereof to the other side of the circumference. Thus, subsequent welds may originate at respective circumferential positions that are separated from the originating position of the immediately preceding weld by about 90° to 180° from the originating position of the immediately preceding weld in accordance with the present invention. Such a weld configuration may reduce, equalize, or minimize distortion and misalignment between the assembled shank 334 and bit body 323.

Figure 2D:
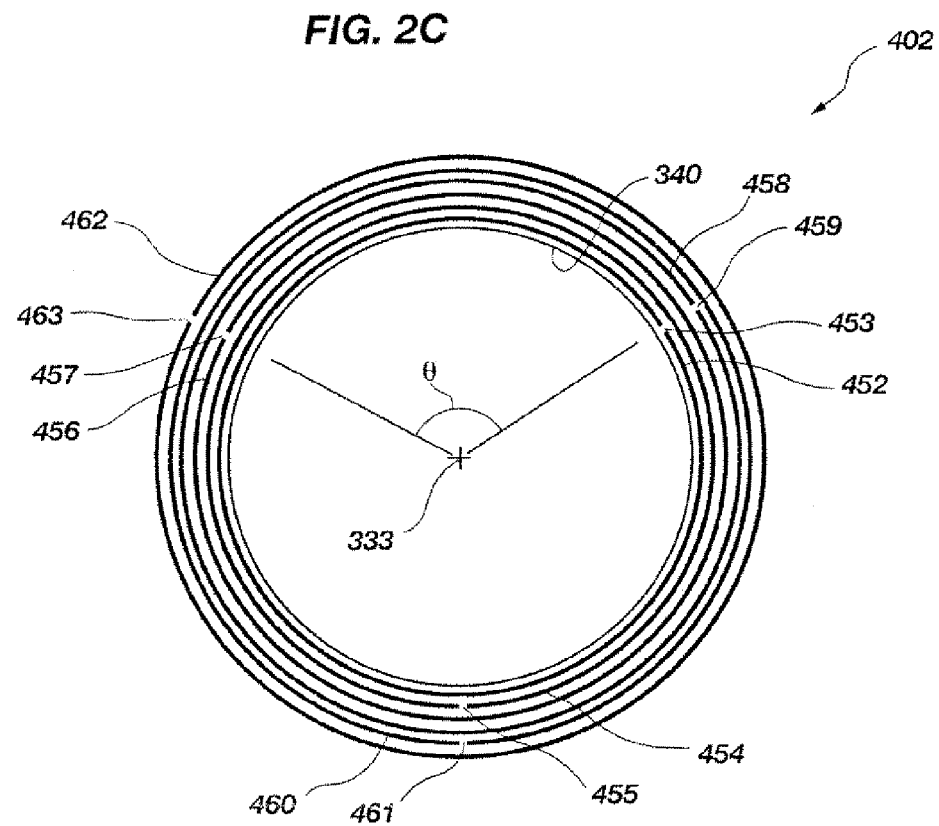

As a further example of the multi-pass weld of the present invention, and without limitation, FIG. 2D shows a top cross-sectional view of multi-pass weld 402 in relation to the tip 340 of the weld recess 339 as shown in FIG. 2B. Welds 452, 454, 456, 458, 460, and 462 may be formed and extend around the circumference of the tip 340 of weld recess 339. First weld 452 may originate at circumferential position 453 and may also terminate thereat. Second weld 454 may originate at circumferential position 455 and may also terminate thereat. Third weld 456, may originate at circumferential position 457 and may also terminate thereat. Fourth weld 458, may originate at circumferential position 459 and may also terminate thereat. Fifth weld 460, may originate at circumferential position 461 and may also terminate thereat. Sixth weld 462, may originate at circumferential position 463 and may also terminate thereat.

Alternatively, and more generally, each weld 452, 454, 456, 458, 460, and 462 may originate at a first circumferential position that is offset from or separated from the circumferential origination position of its preceding weld. Thus, subsequent welds 454, 456, 458, 460, and 462, meaning welds that occur after a preceding weld, may originate at a circumferential position separated from the originating circumferential position of the immediately preceding weld by at least about 90° or at least about one quarter of the circumference of weld tip 340. For instance, separation angle θ, shown by FIG. 2D, illustrates a measure of separation between circumferential position 459 and circumferential position 463 of about 120°. Put another way, the separation distance between circumferential position 459 and circumferential position 463 as shown in FIG. 2D is about one third of the circumference of the circle depicting weld recess tip 340. Further, welds 452, 454, 456, 458, 460, and 462 may be formed about longitudinal axis 333 along any circumferential direction (clockwise or counter-clockwise).

Thus, the multi-pass weld of the present invention is not limited to any particular number of discrete welds, but rather comprises more than one weld wherein the origination position of a preceding and subsequent weld is separated by at least about 90° or at least about one quarter of the circumference of the weld recess tip. Further, the welds may or may not extend circumferentially or at all. For instance, the welds may be formed by applying a heat source and welding medium at a particular position, forming a weld and then positioning the heat source and welding medium at a second position and forming another weld. Thus, welds may be formed within a weld recess at discrete locations. In addition, the separation between the circumferential position of origination between a preceding and immediately subsequent weld may vary. For instance, the separation angle θ may be about 90°, then about 135°, then about 180°, for the second weld, the third weld, and the fourth weld, respectively, without limitation. Further, the origination positions of the welds may form a substantially symmetrical pattern, or may form an unsymmetrical pattern.

Figure 3A:
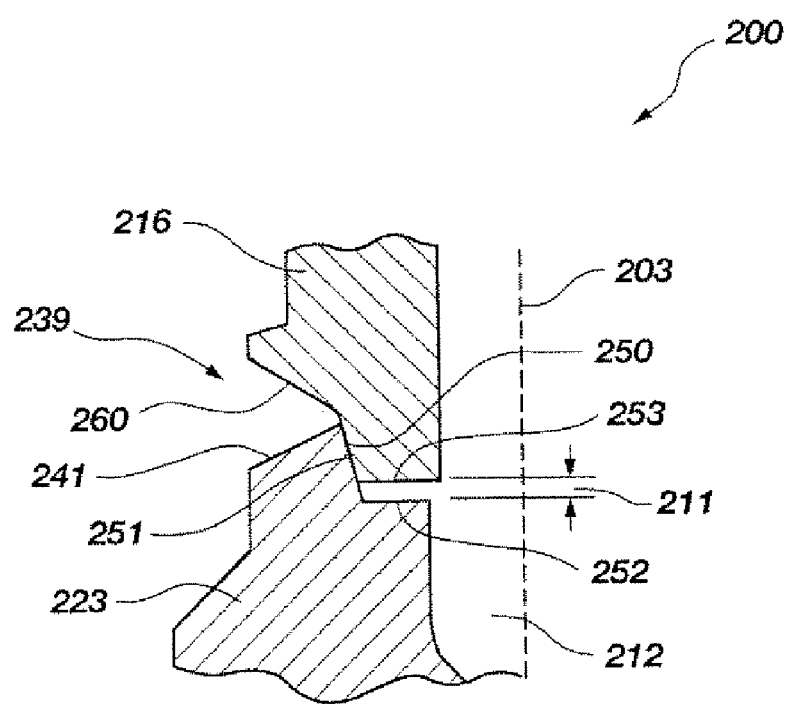
FIGS. 3A-3G are partial schematic side cross-sectional views of different embodiments of interface configurations between a bit body and a shank of the present invention.

FIG. 3A shows a partial cross-sectional view of an interface 200 between a shank 216 and a bit body 223 with respect to bore 212 centered about central axis 203 of a rotary drag bit (remainder not shown). Shank 216 may comprise a material having a carbon equivalent of less than about 0.35% and may include tapered surface 260, tapered surface 250, and horizontal surface 253. Tapered surface 250 of shank 216 may be configured to matingly engage tapered surface 251 of bit body 223 to position shank 216 with respect to bit body 223. Further, gap 211 may separate horizontal surface 253 of shank 216 and horizontal surface 252 of bit body 223, thus inhibiting engagement therebetween that may affect the proper mating engagement between tapered surface 250 of shank 216 and tapered surface 251 of bit body 223. Weld recess 239 may be formed by the intersection of tapered surface 260 of shank 216 with tapered surface 241 of bit body 223. As may be further seen in FIG. 3A, tapered surface 251 and horizontal surface 252 of bit body 223 may form a cavity which the lower longitudinal end of shank 216 fits within. Such a configuration may be advantageous for distributing stresses transmitted through the shank 216 during operation of the rotary drag bit.

Alternatively, gap 211 may be reduced or eliminated by way of a longitudinal force applied to compress the bit body 223 and the shank 216 against one another. Stated another way, it may be desirable to configure tapered surface 250 of shank 216 and tapered surface 251 of bit body 223 so that a sufficient compressive force causes sliding therebetween, reducing gap 211 or causing horizontal surface 253 of shank 216 to engage horizontal surface 252 of bit body 223. Such a compressive force may be applied prior to or during welding of the shank 216 to the bit body 223, or both, and may be desirable as generating a tensile residual stress within the multi-pass weld (FIGS. 2C and 2D) that may be counter-acted by the compressive forces experienced during drilling. Such a configuration may reduce the stresses in the weld during drilling. As a further alternative, gap 211 may be eliminated by sizing the shank and bit body accordingly.

Figure 3B:
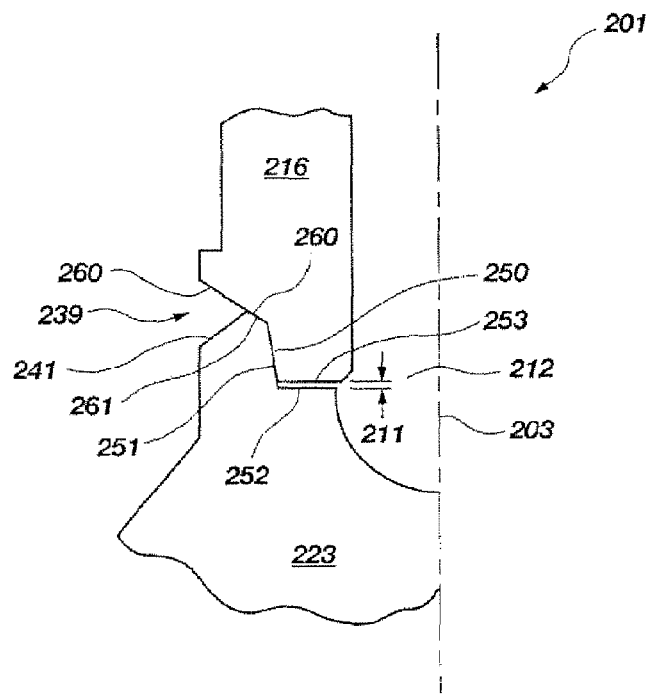

FIG. 3B shows a partial cross-sectional view of another embodiment of interface 201 between shank 216 and bit body 223 with respect to bore 212 centered about central axis 203 of a rotary drag bit (remainder not shown). Shank 216 may comprise a material having a carbon equivalent of less than about 0.35%, such as, for example, an AISI 4130 or AISI 4130MOD steel and may include tapered surface 260, tapered surface 250, and horizontal surface 253. Tapered surfaces 250 and 260 of shank 216 may be configured to matingly engage tapered surfaces 251 and 261 of bit body 223, respectively, to position shank 216 with respect to bit body 223. Such a dual-taper configuration may be advantageous for positioning the shank 216 with respect to the bit body 223.

Further, gap 211 may separate horizontal surface 253 of shank 216 and horizontal surface 252 of bit body 223, thus inhibiting engagement therebetween that may affect the proper mating engagement between tapered surfaces 250 and 260 of shank 216 and tapered surfaces 251 and 261 of bit body 223, respectively. Weld recess 239 may be formed by the engagement of tapered surface 260 of shank 216 with tapered surface 241 of bit body 223. As may be further seen in FIG. 3B, tapered surface 251 and horizontal surface 252 of bit body 223 may form a cavity which the lower longitudinal end of shank 216 fits within. Such a configuration may be advantageous for distributing stresses transmitted through the shank 216 during operation of the rotary drag bit (not shown).

Figure 3C:
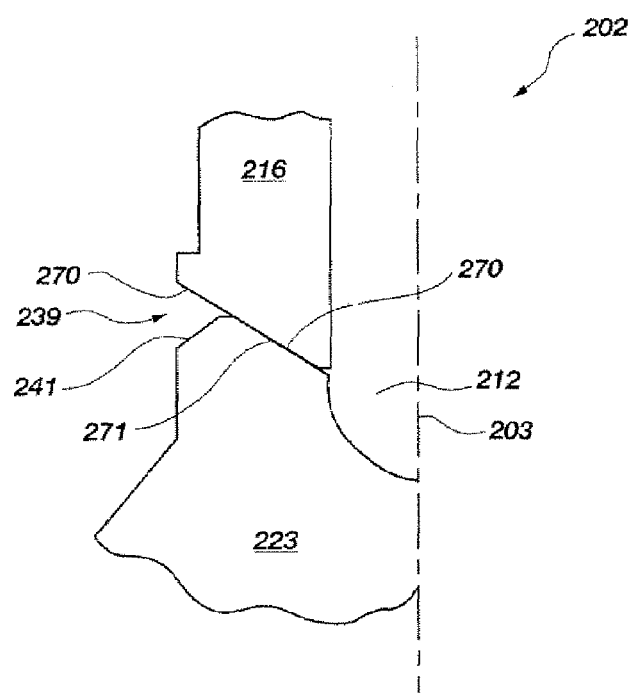

FIG. 3C shows a partial cross-sectional view of another embodiment of the present invention depicting interface 202 between shank 216 and bit body 223 with respect to bore 212 centered about central axis 203 of a rotary drag bit (not shown). As shown in FIG. 3C, tapered surface 270 of shank 216 may be sloped longitudinally downward along a radially inward path, and may matingly engage tapered surface 271 of bit body 223, which may slope longitudinally upward along a radially outward path. Thus, mating engagement between tapered surface 270 of shank 216 and tapered surface 271 of bit body 223 may position shank 216 with respect to bit body 223. Weld recess 239 may be substantially formed by the intersection of tapered surface 241 of bit body 223 and tapered surface 270 of shank 216. Of course, chamfers and radii at boundaries between adjacent surfaces may be used in accordance with engineering design to facilitate proper engagement between tapered surface 270 of shank 216 and tapered surface 271 of bit body 223. As may also be seen in reference to FIG. 3C, tapered surface 271 of bit body 223 may form a cavity which the lower longitudinal portion of shank 216 fits within. Such a configuration may be advantageous for distributing stresses during operation of the rotary drag bit (not shown). In addition, shank 216 may comprise a material having a carbon equivalent of less than about 0.35%, in order to eliminate the need for preheating prior to welding of the shank 216 to the bit body 223.

Figure 3D:
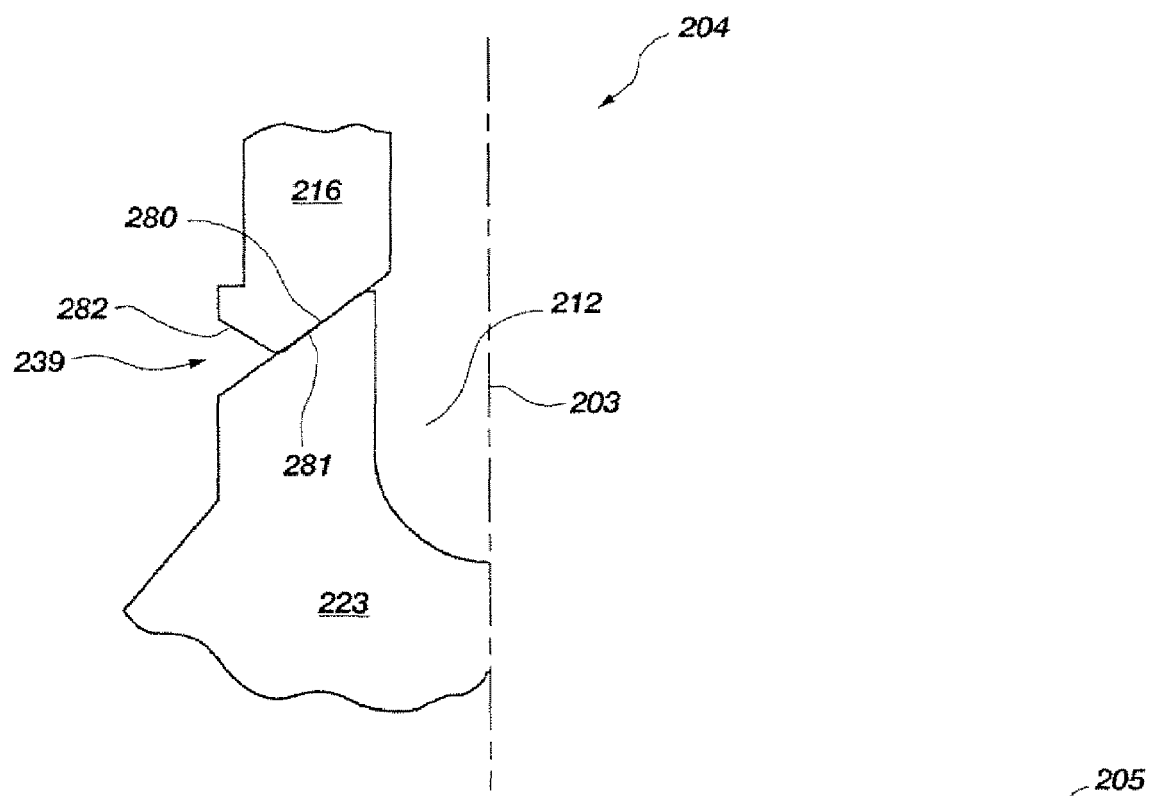

FIG. 3D shows a partial cross-sectional view of yet another embodiment of the present invention depicting interface 204 between shank 216 and bit body 223 with respect to bore 212 centered about central axis 203 of a rotary drag bit (remainder not shown). As shown in FIG. 3D, tapered surface 280 of shank 216 may slope longitudinally upward along a radially inward path, and may matingly engage tapered surface 281 of bit body 223, which may slope longitudinally downward along a radially outward path. Thus, mating engagement between tapered surface 280 of shank 216 and tapered surface 281 of bit body 223 may position shank 216 with respect to bit body 223.

Weld recess 239 may be substantially formed by the intersection of tapered surface 282 of bit body 223 and tapered surface 280 of shank 216. Shanik 216 may comprise a material having a carbon equivalent of less than about 0.35%, such as, for example, an AISI 4130 steel, an AISI 4130MOD steel, or an equivalent material, to eliminate the need for preheating the shank prior to welding the shank 216 and bit body 223 to one another. Such a configuration may allow the shank 216 and bit body 223 to be tack welded in order to maintain the relative positioning thereof prior to forming the multi-pass weld as described above and eliminate conventional preheating thereof during welding.

Figure 3E:
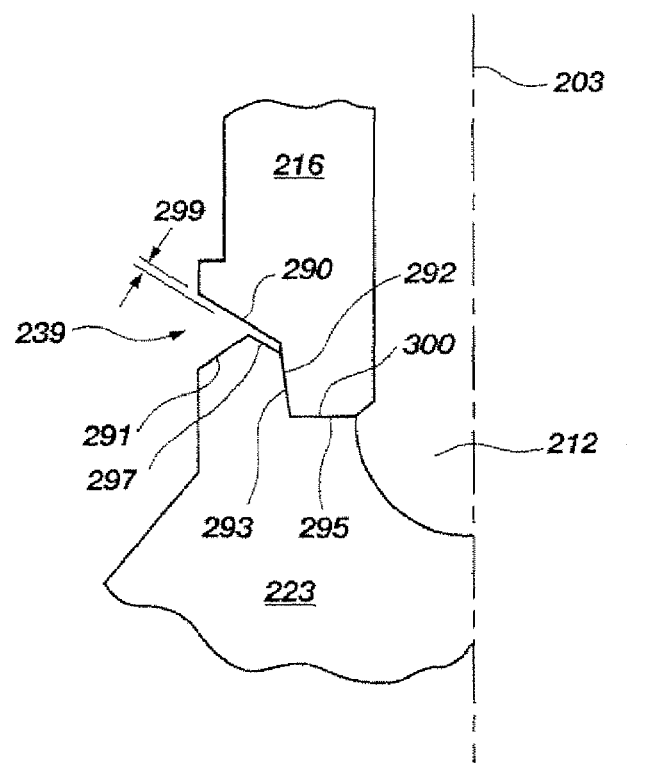

FIG. 3E shows a further embodiment of the present invention depicting a cross-sectional view of interface 205 between shank 216 and bit body 223. As mentioned above, shank 216 may comprise a material having a carbon equivalent of less than about 0.35%. Shank 216 and bit body 223 are shown in relation to bore 212, which is centered about central axis 203 of a rotary drag bit (remainder not shown). Tapered surface 292 of shank 216 may matingly engage tapered surface 293 of bit body 223 to position the shank 216 in relation to the bit body 223. Also, horizontal surface 300 of shank 216 may matingly engage horizontal surface 295 of bit body 223, thereby vertically positioning the shank 216 in relation to the bit body 223. Gap 299 may exist between tapered surface 290 of shank 216 and tapered surface 297 of bit body 223. Gap 299 may provide clearance for fitting the shank 216 and the bit body 223 together. Weld recess 239 may be substantially formed by tapered surface 290 of shank 216 and tapered surface 291 of bit body 223.

Figure 3F:
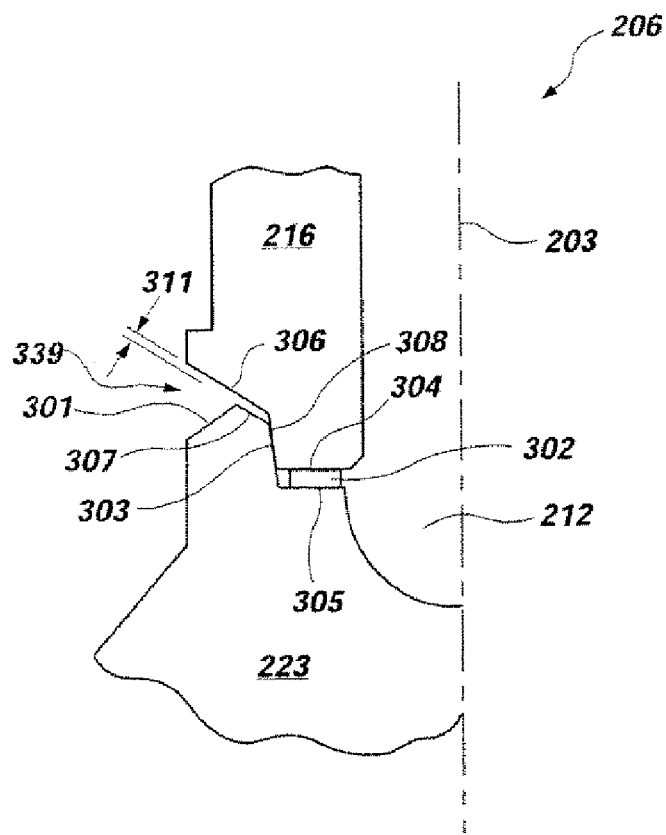
Figure 3G:
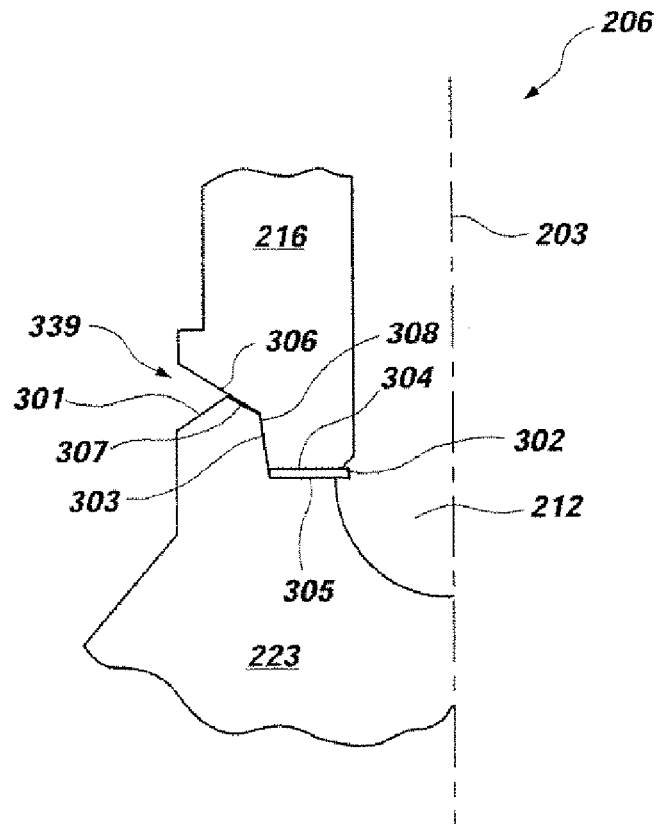

FIGS. 3F and 3G show a cross-sectional view of interface 206 according to the present invention between shank 216 and bit body 223. More specifically, a deformable element 302 may be positioned between shank 216 and bit body 223. As shown in FIGS. 3F and 3G, deformable element 302 may be positioned between horizontal surface 304 of shank 216 and horizontal surface 305 of bit body 223. Gap 311 may exist initially between tapered surface 306 of shank 216 and tapered surface 307 of bit body 223. Further, tapered surface 303 of bit body 223 may engage tapered surface 308 of shank 216 or, alternatively, there may be slight clearance therebetween. However, as shown in FIG. 3G, shank 216 may be displaced so as to deform deformable element 302 and position tapered surface 306 of shank 216 to matingly engage tapered surface 307 of bit body 223, thus substantially eliminating gap 311. Such a configuration may be preferable to position the shank 216 in relation to the bit body 223 by way of a compressive force. Such a compressive force may be applied prior to and/or during welding of the shank 216 to the bit body 223, and may effect a tensile residual stress within the multi-pass weld (FIGS. 2C and 2D) that may be desirable as reducing the stresses in the weld during drilling. Also, as shown in FIGS. 3F and 3G, weld recess 339 may be substantially formed by tapered surface 306 of shank 216 and tapered surface 301 of bit body 223. Exemplary deformable elements 302 include high temperature elastomeric rings, annular leaf springs and Belleville springs, as well as nonresilient deformable materials that may be crushed as gap 311 is eliminated. Deformation, resilient or nonresilient, of deformable element 302 may provide controlled downward movement of shank 216 as it is caused to engage bit body 223.

Figure 4:
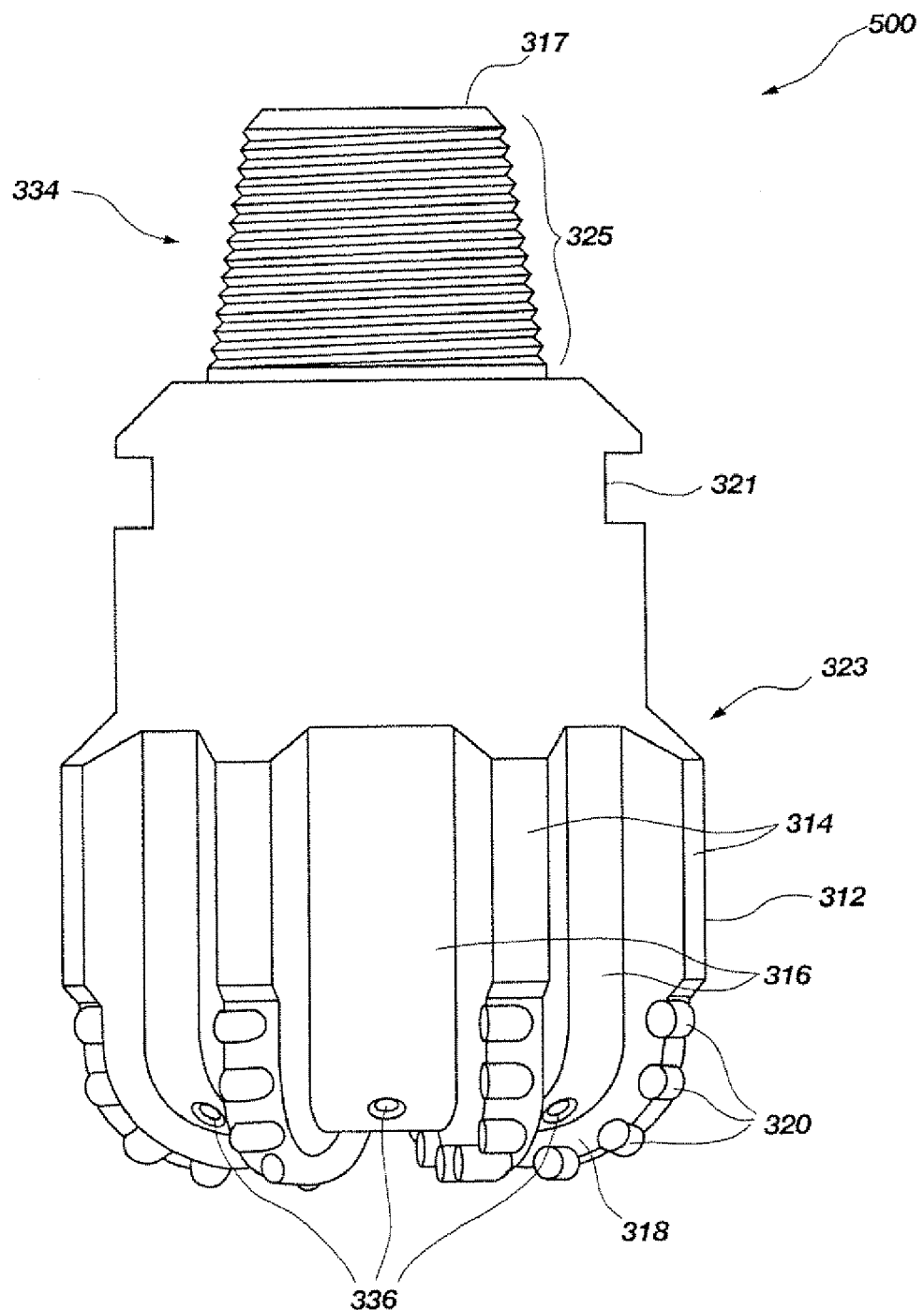
FIG. 4 is a side view of a rotary drill bit according to the present invention.

FIG. 4 shows an exemplary rotary drag bit 500 according to the present invention wherein an interface and multi-pass weld as described above have been completed to affix bit body 323, either steel body or matrix-type, to the shank 334. Shank 334 may include bit breaker surfaces or flats 321 for loosening and tightening the tapered threaded portion 325 of the rotary drag bit 500 when installed into the drill string. Rotary drag bit 500 may include radially and longitudinally extending blades 314, wherein each blade 314 may define a leading or cutting face 318 and may include a plurality of cutting elements 320 affixed thereto and oriented therein to cut a subterranean formation upon rotation of the rotary drag bit 500. Nozzles 336 may be sized and positioned to communicate drilling fluid from the interior of the rotary drag bit 500 to the cutting elements 320 and blades 314 to clean cuttings therefrom. Upon completion of multi-pass weld (not shown), the exterior, radially outward surface thereof may be machined flush with an outer surface of bit body 323. Further, it should be understood that the present invention is not limited to rotary drill bits fabricated by way of any particular method; rather, the present invention may be practiced with rotary drill bits fabricated by any method.

Generally, the tapered surface arrangements and configurations of the present invention may provide an efficient mechanism to position the shank in relation to the bit body in preparation for welding therebetween. In addition, a longitudinal, generally axial force may be applied to the shank or bit body as described hereinabove to facilitate positioning or centering of the shank in relation to the bit body, with or without the disposition of a deformable element therebetween. Also, a longitudinal force may be applied to achieve a desired stress state in the assembly in relation to welding the shank to the bit body. The longitudinal force may be applied externally, by way of a piston or by other force generation means. On the other hand, with respect only to positioning, the tapered surfaces of the shank and bit body may be configured and sized so that the weight of the shank as it is disposed longitudinally above the bit body facilitates positioning or centering thereof in relation to the bit body as it is lowered thereonto. In such a configuration, the shank may be "self-centering."

In addition, although the foregoing descriptions depict "tapered surfaces" in the form of cross-sectional representations that may imply continuous annular surfaces such as frustoconical surfaces, the present invention contemplates that the tapered surfaces may comprise more generally tapered features that may or may not be continuous and may or may not be linear in cross-section. Likewise, although the foregoing illustrations and descriptions may imply an annular weld recess, many alternatives are contemplated by the present invention. For instance, the multi-pass weld of the present invention may be formed in relation to, generally, a region configured for forming a welded connection between the shank and bit body, without limitation.

More specifically, the present invention contemplates that complementary longitudinal recesses may be formed in the mating ends of both the shank and bit body for welding to one another. In other words, the longitudinal mating ends of both the shank and bit body may comprise splines that may be aligned to form longitudinal weld recesses. In such a configuration, a respective weld may be formed within each aligned longitudinal weld recess. However, in such a configuration, the multi-pass weld of the present invention may be formed within the longitudinal weld recesses. More specifically, in such a configuration, a first weld may originate from a first circumferential position and a second weld may originate from a circumferential position separated from the first circumferential position. Each subsequent weld may originate from a respective circumferential position that is at least about 90° from the origination position of its immediately preceding weld.

Figure 5A:
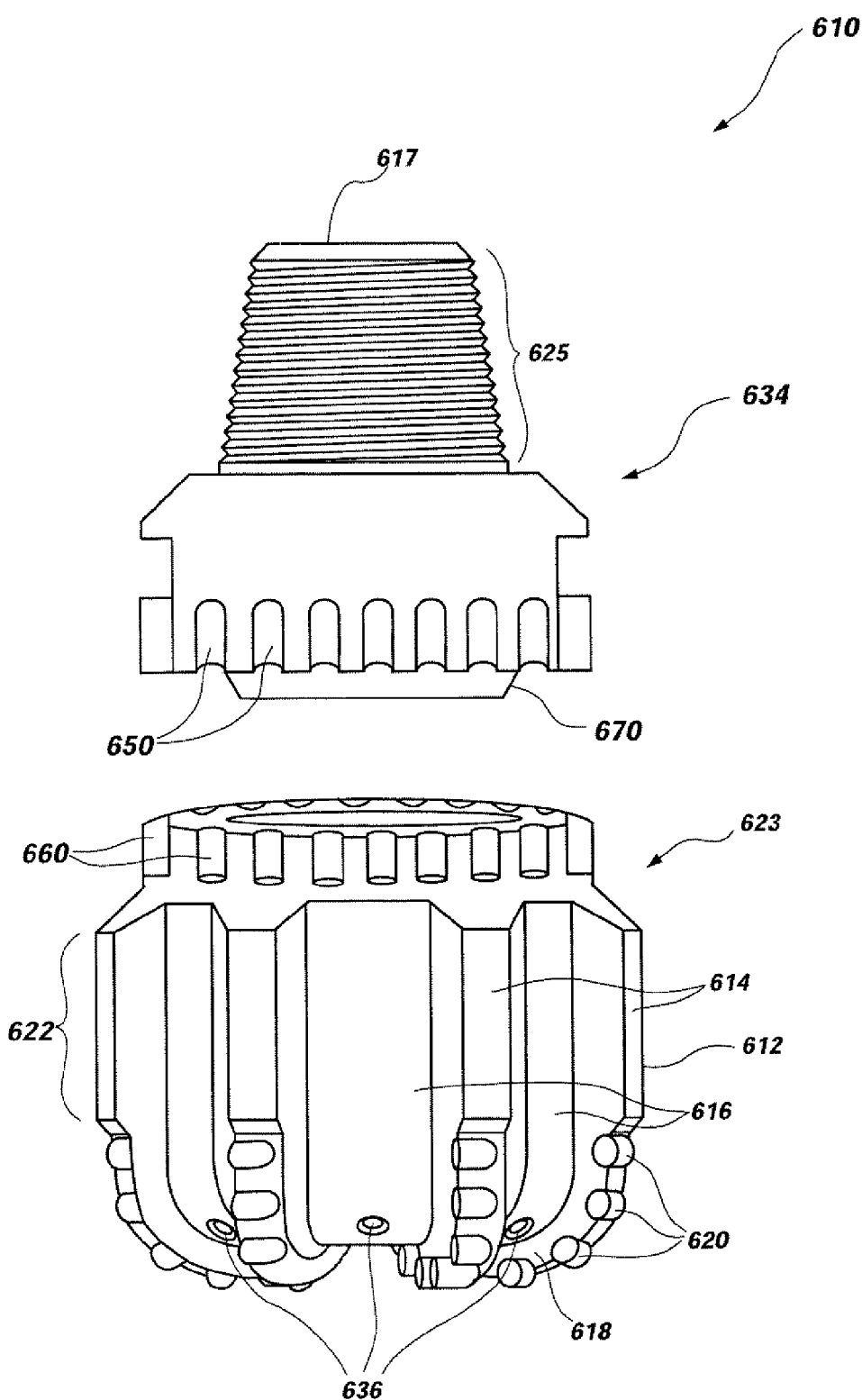
FIG. 5A shows a perspective view of a rotary drill bit of the present invention.

FIG. 5A shows a perspective view of a rotary drill bit 610 prior to welding in accordance with the present invention. Rotary drill bit 610 may generally comprise a bit body 623 including a plurality of longitudinally extending blades 614 defining junk slots 616 therebetween and having a leading or cutting face 618 that extends radially along the bit face of the rotary drill bit 610. Bit body 623 may include a plurality of cutting elements 620 affixed thereto to cut a subterranean formation upon rotation of the rotary drill bit 610. Cutting elements 620 are shown for illustration only, as they may be affixed to the bit body 623 after the shank 634 is welded to the bit body 623, in accordance with conventional practices. Shank 634, according to the present invention, may comprise a material having a carbon equivalent of less than about 0.35%. For example, an AISI 4130 steel, an AISI 4130MOD steel, or any material having a carbon equivalent of less than about 0.35% may be used, without limitation. Each blade 614 may define a longitudinally extending gage portion 622 that corresponds to the gage 612 of each blade 614, sized according to approximately the largest-diameter-portion of the rotary drill bit 610. The upper longitudinal end 617 of the rotary drill bit 610 includes a threaded portion or pin 625 to threadedly attach the rotary drill bit 610 to a drill string, as is known in the art. In addition, drilling fluid may be communicated through nozzles 636 disposed on the face of the rotary drill bit 610.

Figure 5B:
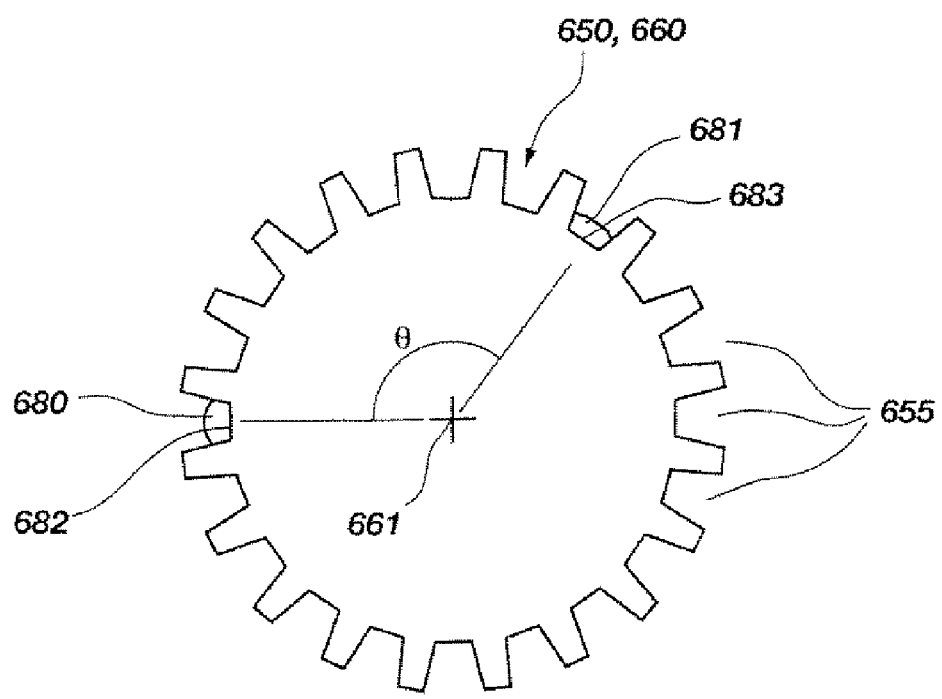
FIG. 5B shows a partial top cross-sectional view of a shank and bit body as shown in FIG. 5A.

Shank 634 includes longitudinal recesses 650 which correspond to longitudinal recesses 660 of bit body 623. Further, shank 634 may include tapered feature 670, which may be configured according to any of the embodiments described in FIGS. 2A, 2B, and 3A-3G, and which may be termed a protrusion for the sake of convenience only. Of course, bit body 623 may include a complementary tapered feature (not shown), which may be termed a recess for the sake of convenience only. Upon assembly of shank 634 and bit body 623, the longitudinal recesses 650 of the shank 634 and the longitudinal recesses 660 of the bit body 623 may be aligned circumferentially. FIG. 5B shows a partial top cross-sectional view of the longitudinal recesses 650 of the shank 634 and the longitudinal recesses 660 of the bit body 623 wherein the longitudinal recesses 650 and 660 are vertically superimposed and circumferentially aligned. Such alignment may form weld recesses 655, as shown in FIG. 5B.

Further, according to the present invention, a multi-pass weld may be formed within weld recesses 655. A first weld 680 is shown in FIG. 5B at a circumferential position of origination 682, and may extend longitudinally within the aligned longitudinal recesses 650 and 660. A second weld 681 may be formed at a circumferential position of origination 683 that is separated from the circumferential position of origination 682 of first weld 680 by at least 90°, as depicted by separation angle θ in relation to longitudinal axis 661. Subsequent welds (not shown) may be positioned so that each subsequent circumferential position of origination is separated from the circumferential position of origination of its immediately preceding weld.

There are many alternative implementations that are contemplated and encompassed by the present invention. For instance, a weld region may be formed by alignment of spiraled splines or recesses in one or both of the shank and bit body. Further, although the multi-pass weld of the present invention may be described in terms of preceding and subsequent welds, as hereinabove, it is contemplated that one or more welds of the present invention may be formed substantially simultaneously by way of application of multiple heat sources and disposition of welding materials at more than one location within a weld region. In such a configuration, a simultaneously formed weld may be taken as either subsequent or preceding in relation to any other weld simultaneously formed therewith, without limitation. For example, without limitation, the present invention contemplates that two welds may be formed substantially simultaneously, separated by a separation angle of at least about 90°. Further, for example, without limitation, the present invention contemplates that three welds may be formed substantially simultaneously, wherein at least two of the three welds are separated by at least about 90°. Such a configuration may increase the cost of the welding equipment, but may also increase the speed or performance of the welding process and further reduce any tendency toward misalignment of the shank and bit body that may be induced by welding.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors. Further, the invention has utility in drill bits and core bits having different and various bit profiles as well as cutter types.

What is claimed is:

1. A method of fabricating a rotary drill bit, comprising:
providing a shank structure for attaching the rotary drill bit to a drill string configured with at least one tapered feature for positioning the shank structure;
providing a bit body having an end configured for drilling a subterranean formation, the bit body including at least one complementary tapered feature for positioning the shank structure in relation thereto;
positioning the shank structure by matingly engaging the at least one tapered feature of the shank structure and the at least one complementary tapered feature of the bit body and defining a weld region between the shank structure and the bit body;
forming a first weld originating from a first circumferential position within the weld region;
forming at least a second weld originating from a second circumferential position within the weld region;
wherein the second circumferential position and the first circumferential position are separated by at least about 90° in relation to the centerline of the bit body.

2. The method of claim 1, wherein providing the shank structure comprises providing a shank structure formed from a material having a carbon equivalent less than about 0.35%.

3. The method of claim 2, wherein providing the shank structure formed from a material having a carbon equivalent less than about 0.35% comprises providing a shank structure formed from AISI 4130 steel or AISI 4130MOD steel.

4. The method of claim 1, wherein forming the first weld and forming the at least a second weld comprises forming the first weld and the at least a second weld substantially simultaneously.

5. The method of claim 1, further comprising applying a compressive force between the at least one tapered feature of the shank structure and the at least one complementary tapered feature of the bit body while forming the first weld.

6. The method of claim 1, wherein providing the shank structure configured with at least one tapered feature comprises providing a shank structure configured with at least one tapered surface.

7. The method of claim 6, wherein providing the bit body including at least one complementary tapered feature comprises providing a bit body including at least one complementary tapered surface.

8. The method of claim 7, wherein the at least one complementary tapered surface of the bit body forms a cavity therein.

9. The method of claim 8, further comprising disposing a portion of the shank structure within the cavity formed within the bit body.

10. The method of claim 9, further comprising configuring the weld region to be a substantially annular groove.

11. The method of claim 9, wherein forming the least a second weld comprises forming more than one weld, wherein each of the more than one weld includes a circumferential position of origination, respectively; and selecting an origination position of each of the more than one weld to be separated from the circumferential position of origination of its immediately preceding weld by at least about 90°.

12. The method of claim 11, wherein forming the first weld and each of the more than one welds comprises forming a circumferentially extending weld.

13. The method of claim 12, wherein forming the circumferentially extending weld comprises forming a weld that extends substantially around the entire circumference of the weld region.

14. The method of claim 1, wherein positioning the shank structure by matingly engaging the at least one tapered feature of the shank structure and the at least one tapered complementary feature of the bit body comprises deforming a deformable element positioned between the shank structure and the bit body.

15. The method of claim 1, further comprising forming the first weld and the at least a second weld without preheating at least the shank structure.

* * * * *

UNITED STATES PATENT AND TRADEMARK OFFICE
CERTIFICATE OF CORRECTION

PATENT NO.         : 7,594,454 B2
APPLICATION NO.    : 11/947613
DATED              : September 29, 2009
INVENTOR(S)        : Anton F. Zahradnik et al.

It is certified that error appears in the above-identified patent and that said Letters Patent is hereby corrected as shown below:

In the specification:

| | | |
|---|---|---|
| COLUMN 4, | LINE 62, | change "of shank" to --of the shank-- |
| COLUMN 4, | LINE 66, | change "of shank" to --of the shank-- |
| COLUMN 5, | LINE 13, | change "of a shank" to --of the shank-- |

Signed and Sealed this
Seventeenth Day of May, 2011

David J. Kappos
*Director of the United States Patent and Trademark Office*